United States Patent Office 3,406,173
Patented Oct. 15, 1968

3,406,173
2-n-DECYL-3-(o-METHYL-p-AMINO-PHENYL)-3H-4-QUINAZOLONE
Alex Heusner, Karl Zeile, and Peter Danneberg, Ingelheim am Rhein, Germany, assignors to Boehringer Ingelheim G.m.b.H., Ingelheim am Rhein, Germany, a corporation of Germany
No Drawing. Filed Apr. 29, 1966, Ser. No. 546,217
Claims priority, application Germany, May 5, 1965, B 81,761
2 Claims. (Cl. 260—256.4)

ABSTRACT OF THE DISCLOSURE

A 2 - higher alkyl-3-aminophenyl-4(3H)-quinazolinone is disclosed. The compound and its acid addition salts may be used as sedatives and anticonvulsants.

This invention relates to a novel 2-alkyl-3-phenyl-3H-4-quinazolone derivative and acid addition salts thereof, as well as to methods of preparing these compounds.

More particularly, the present invention relates to 2-n - decyl-3-(o-methyl-p-amino-phenyl)-3H-4-quinazolone of the formula

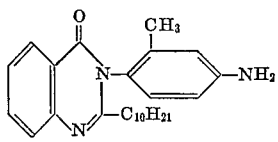

(I)

and non-toxic, pharmacologically acceptable acid addition salts thereof.

The compound of the Formula I above may be prepared by reducing the corresponding p-nitro-phenyl quinazolone of the formula

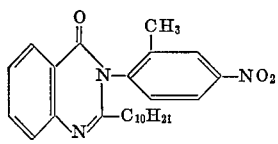

(II)

with catalytically activated hydrogen or nascent hydrogen.

Since the compound of the Formula I is an organic base, it forms acid addition salts and particularly, non-toxic, pharmacologically acceptable acid addition salts with inorganic or organic acids. Examples of non-toxic, pharmacologically acceptable acid addition salts include, but are not limited to, those formed with hydrochloric acid, hydrobromic acid, phosphoric acid, sulfuric acid, acetic acid, lactic acid, tartaric aid, methane-sulfonic acid, benzoic acid, citric acid, ascorbic acid, propionic acid, salicylic acid, 8-chlorotheophylline or the like. The acid addition salts may conveniently be obtained by dissolving the free base in a suitable solvent, and acidifying the solution with the desired inorganic or organic acid.

The following example further illustrates the invention and will enable others skilled in the art to understand it more completely.

Example 1.—Preparation of 2-n-decyl-3-(o-methyl-p-amino-phenyl)-3H-4-quinazolone 8.43 gm. (0.02 mol) of 2-n-decyl-3-(o-methyl-p-nitrophenyl)-3H-4-quinazolone were dissolved in 150 cc. of ethanol, Raney nickel was added to the solution, and the mixture was hydrogenated at room temperature and atmospheric pressure until absorption of hydrogen was complete. Thereafter, the reaction mixture was filtered to remove the catalyst, and the filtrate was evaporated in vacuo. A solid residue was obtained, which was recrystallized from a mixture of ethanol and water, yielding the reaction products in the form of colorless needles having a melting point of 56–58° C. It was identified to be 2-n-decyl - 3 - (o-methyl-p-amino-phenyl)-3H-4-quinazolone. The yield was virtually quantitative.

The 2 - n-decyl-3-(o-methyl-p-nitrophenyl)-3H-4-quinazolone (M.P. 85–87° C.) used as starting material above, may be obtained in customary fashion from N-undecanoyl-anthranilic acid and 5-nitro-2-amino-toluene in the presence of a dehydrating agent, such as phosphorus oxychloride or phosphorus trichloride. The N-undecanoyl anthranilic acid (M.P. 84–87° C.) in turn may be obtained from anthranilic acid and undecanoic acid chloride or undecanoic acid anhydride, or by oxidation of N-undecanoyl-o-toluidine with potassium permanganate.

The compounds according to the present invention, that is, 2 - n - decyl-3-(o-methyl-p-amino-phenyl)-3H-4-quinazolone and its non-toxic, pharmacologically acceptable acid addition salts, have useful pharmacodynamic properties. More particularly, they exhibit very effective sedative and anticonvulsive activities in warm-blooded animals without concurrent stimulation of the central nervous system and/or ataxia. This favorable combination of pharmacological activities is completely unexpected from the prior art teachings, in that it was heretofore believed that the replacement of the 2-methyl group in 2-methyl-3-aryl-3H-4-quinazolones by a higher homologous alkyl group brings about a significant reduction in the sedative activity (Andrisano and Chiesi, C.A. 58, 3428).

For pharmaceutical purposes the compounds according to the present invention are administered perorally or parenterally, preferably perorally, to warm-blooded animals as active ingredients in dosage unit compositions, that is, compositions in dosage unit form consisting essentially of an inert pharmaceutical carrier and one dosage unit of the active ingredient, such as tablets, coated pills, solutions, suspensions, syrups, capsules, wafers, suppositories and the like. One dosage unit of the compounds according to the invention is from 20 to 400 mgm., preferably 50 to 200 mgm.

The following example illustrates a dosage unit composition comprising a compound of the present invention as an active ingredient. The parts are parts by weight.

Example 2.—Tablets

The tablet composition is compounded from the following ingredients:

| | Parts |
|---|---|
| 2 - n - decyl-3-(o-methyl-p-amino-phenyl)-3H-4-quinazolone | 100.0 |
| Lactose, pulverized | 130.0 |
| Corn starch | 156.0 |
| Colloidal silicic acid | 8.0 |
| Soluble starch | 4.0 |
| Magnesium stearate | 2.0 |
| Total | 400.0 |

Compounding procedure.—The individual ingredients are admixed with each other in customary fashion to form a composition suitable for feeding into a tablet-making machine. The composition is then pressed into 400 mgm.-tablets, each of which contains 100 mgm. of the active ingredient.

It should be understood that any non-toxic, pharmacologically acceptable acid addition salt of the quinazolone compound in Example 2 may be substituted for the free base, and that the amount of the active ingredient may be varied within the dosage unit limits set forth above. Moreover, the nature and amounts of the inert ingredients may be varied to meet particular requirements.

While the present invention has been illustrated with the aid of certain specific embodiments thereof, it will be readily apparent to others skilled in the art that the invention is not limited to the illustrative embodiments and that various changes and modifications may be made without departing from the spirit of the invention or the scope of the appended claims.

Example 3

2 - n-decyl-3-(o-methyl-p-amino-phenyl)-3H-4-quinazolone monohydrochloride, M.P. 204–208° C., was prepared from 2-n-decyl-3-(o-methyl-p-amino-phenyl)-3H-4-quinazolone dissolved in ethanol by addition of concentrated hydrochloric acid and subsequent addition of water.

We claim:

1. The compound of the formula

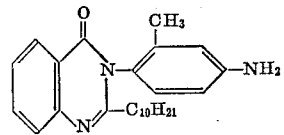

or a non-toxic, pharmacologically acceptable acid addition salt thereof.

2. 2 - n-decyl-3-(o-methyl-p-amino-phenyl)-3H-4-quinazolone.

References Cited

UNITED STATES PATENTS 2,439,386    4/1948    Guenther et al. _____ 200—256.4
3,213,094    10/1965    Morgan et al. _____ 260—256.4

NICHOLAS S. RIZZO, *Primary Examiner.*

R. J. GALLAGHER, *Assistant Examiner.*